J. B. UNDERWOOD.
Combined Coffee Roaster and Cooler.
No. 196,274. Patented Oct. 16, 1877.
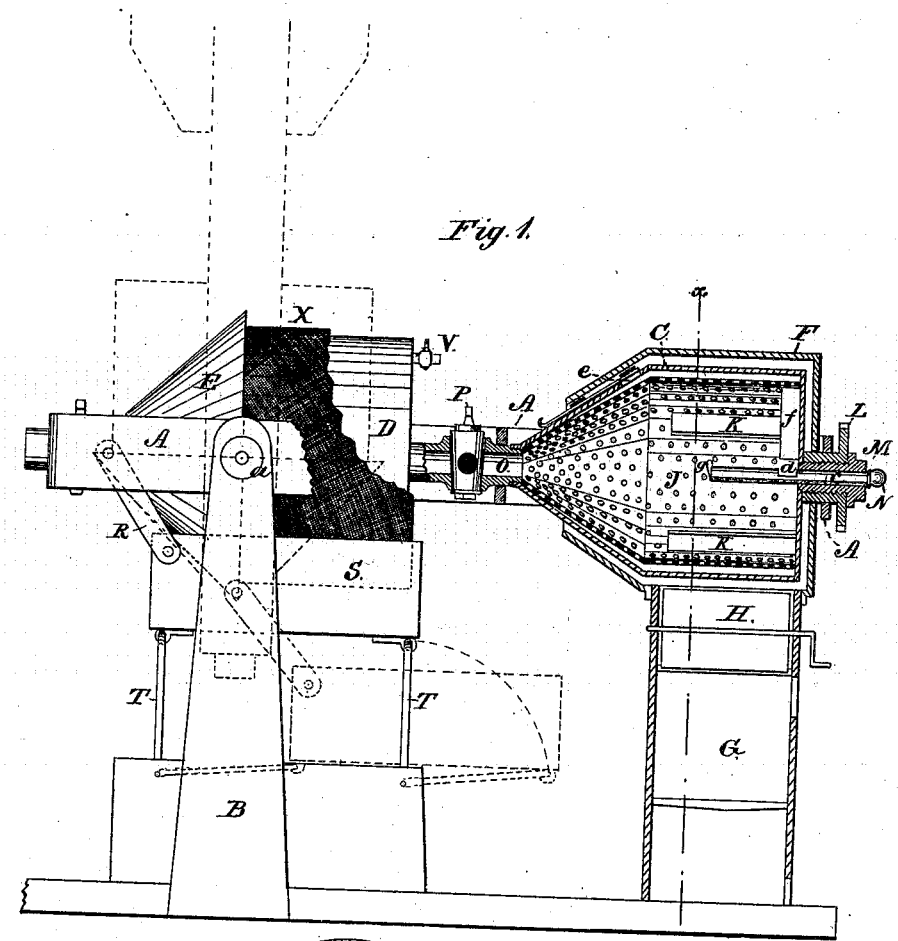
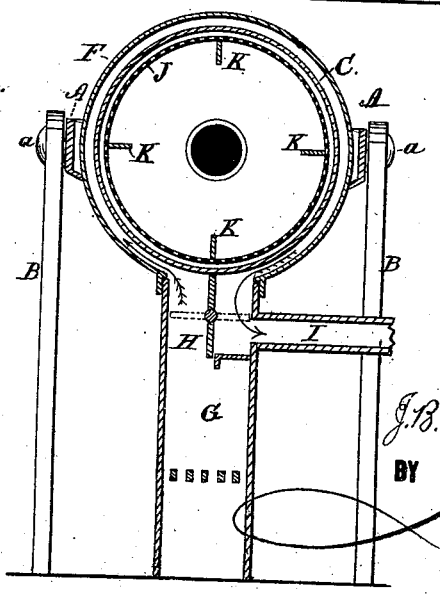

UNITED STATES PATENT OFFICE.

JOSEPH B. UNDERWOOD, OF FAYETTEVILLE, NORTH CAROLINA.

IMPROVEMENT IN COMBINED COFFEE ROASTER AND COOLER.

Specification forming part of Letters Patent No. 196,274, dated October 16, 1877; application filed March 29, 1877.

*To all whom it may concern:*

Be it known that I, JOSEPH B. UNDERWOOD, of Fayetteville, in the county of Cumberland and State of North Carolina, have invented a new and Improved Combined Coffee Roaster and Cooler; and I do hereby declare that the following is a full, clear, and exact description of the same, reference being had to the accompanying drawing, forming part of this specification, in which—

Figure 1 is a side view with the roasting cylinder and case in section, the fibrous jacket of the cooling-cylinder partly broken away, and the elevated position of the roaster indicated in dotted lines. Fig. 2 is a vertical transverse section through line $x\ x$.

The invention consists in means for carrying out the method of roasting coffee for which Letters Patent were granted me, May 16, 1876, by which method the volatile products that arise from the coffee being roasted are utilized by being conveyed to a closed communicating chamber for cooling the coffee, where the said flavoring and aromatic exhalations which are being given off from the roasting coffee are restored to the hot roasted coffee as it is cooled, the method serving to preserve the roasted coffee and render it less susceptible to the damaging influences of the atmosphere, and at the same time preserving the full strength of the flavor, and obviating loss in weight.

The means consist, generally, in a revolving roasting-cylinder arranged in combination with a revolving cooling and condensing cylinder, and so connected as to admit of the transfer of the generated volatile products from the first to the latter without condensation in transit, and, finally, of the transfer of the entire charge of roasted coffee from the roasting to the cooling cylinder.

The invention further consists in the peculiar construction and arrangement of parts, as will be hereinafter more fully described.

In the drawing, A represents a frame, in which are journaled the revolving cylinders, the said frame being pivoted at $a$ to the standards B, which pivots allow it to be raised from its horizontal position to a vertical one. C is the roasting-cylinder, and D the cooling and condensing cylinder, both of which are constructed with conical ends. The roasting-cylinder C is contained within an outer casing, F, which leaves an annular space around the said chamber, in which circulates the hot air from a furnace, G, the heat being regulated by a damper, H, which is so arranged as to allow the hot air to circulate in the annular space, as shown, or be turned horizontally, so as to cut it off from said space and direct the same out through the smoke-pipe I. The said casing F is provided with a flanged opening at its bottom, which, when the cylinders are in a horizontal position, exactly registers with the opening in the top of the furnace G, the casing being made separable from said furnace. The cylinder C is provided with an inner perforated lining, J, in which is contained the coffee to be roasted, the perforations of the said lining being of a size small enough to prevent the passage of the grains through the same. The object of this perforated lining is to keep the grains of coffee from direct contact with the fire-heated surface, and still allow the transmission and radiation of heat to the interior of the cylinder.

K are longitudinal wings, lifters, or agitators attached to the interior of the lining J, which, in the revolution of the cylinder, stir the coffee to produce uniformity of roasting.

L is a cog-wheel attached to the cylinder C, by means of which rotary motion is transmitted to the same. In smaller machines, for retail dealers, this wheel will be supplanted by a hand-crank at one or the other of the ends of the machine.

M is a detachable plug or stopper, which is shown as screw-threaded to fit into the opening through which the charge of coffee is introduced. Other means besides screw-threads, however, may be employed to hold said stopper.

N is a sampling device, which consists of a longitudinally-sliding stem, $c$, fitted in the plug M, with a steam-tight packing extended inside the cylinder, and provided with a cup, $d$. When the sampler is used to ascertain the progress of the roasting process upon the coffee, a trough or spout, $f$, attached radially to the end of the cylinder, in its revolution gathers up a portion of the coffee from the periphery of the cylinder, where it is most exposed to the heat, and deposits it in the cup, which, during a part of the revolution, is immediately beneath the inner end of the trough. The sampler may be then drawn out and the sample examined, the character of the devices being such as enables the operator to get a sample at any stage of the process, and without respect to the size of the charge.

To prevent the entire withdrawal of the stem by accident, the inner end is provided with an extension, g, and to enable the operator to tell which side of the stem the cup is on, its position is indicated on the outer extension of said stem by a distinguishing-mark.

When a charge of green coffee is first inserted into the roasting-cylinder, there is a quantity of the vapor from the water of vegetation which it is not desirable to retain, and to permit its escape, as well as to obviate the effects of pressure upon the cylinder, an escape-vent, e, closed by a slide, is employed, which permits the escape of the said vapors into the smoke-flue through the annular chamber about the cylinder.

The cooling and condensing cylinder D, as shown, is attached to the roasting-cylinder so as to revolve with it, and is provided with a communication, O, which may be opened or closed by a cut-off or stop-cock, P.

S is a tank, which is held beneath cylinder D, upon supports T, and is filled with water. In this tank the cylinder D is partially or wholly immersed, and about the latter is arranged a jacket, X, of fibrous absorbent material, which carries up a portion of the water, and, by facilitating evaporation, produces a more rapid cooling of the coffee.

V is a relief valve or cock opening into the cooling-cylinder, which is employed for relieving too great a pressure or preventing a collapse from too rapid condensation.

E is a drip-cup arranged about the conical end of the cylinder D, and designed to catch the water which drips from the jacket X when the cylinders are turned into a vertical position, and thus to prevent the same from dripping into the cooled coffee as it is discharged. In the place of the water-tank, a stream of water may be allowed to trickle upon the jacket of the cooling-cylinder.

In arranging the tank S with respect to the cylinder D, I have made its supports T pivoted or hinged both at the top and bottom, and have connected the rear end of the frame A with said tank by means of links R, so that, when the frame A and cylinders are turned to a vertical position, the tank descends in an arc upon its supports, as shown in dotted lines. The principal advantage of this arrangement is that it economizes space, and enables me to successfully use the device in a single story, or between the ceiling and floor of an ordinary room, the tank moving out of the way as the cylinders are turned, while less power is also required in turning the frame and its cylinders, as, the weight of the water-tank being transmitted through links R to the frame A upon the opposite side of the pivots, it assists in raising the frame and cylinders, and renders unnecessary the use of a rope and pulley for the purpose.

The operation of my improved coffee-roaster is as follows: The roasting-cylinder is first provided with a charge of coffee, through the opening filled by the detachable plug M, the heat of the furnace regulated to suit, and the cog-wheel or crank L made to rotate the cylinders. The vent e is then opened to allow the water of vegetation and the useless portions of the vapors to pass off, which portions constitute the only loss in weight which the coffee meets with during the whole process. As soon as the skill and experience of the operator shall have determined when a sufficient quantity has passed off, the valve is closed, and the aromatic and flavoring exhalations which arise from the coffee are retained, the coffee being agitated in the meantime by the wings K, and sampled from time to time to note the progress of the roasting process. As soon as the coffee is completely roasted, the frame A is raised to a vertical position. Communication with the cooling-cylinder through pipe O is now opened, and the roasted charge of coffee passed through to the cooling-cylinder, and, after the said communication is closed, a fresh charge placed in the roasting-cylinder. The frame is now lowered to its horizontal position, and the cylinders revolved together as before. The coffee in the cooling-chamber is now being gradually cooled by the rotation of the cylinder in the water of tank, and as it cools the charge of coffee in the roasting-cylinder is giving off its volatile vapors and extracts, which, after the water of vegetation has been allowed to escape, are admitted to the cooling-charge in cylinder D through the same pipe O through which the coffee passes. This passage of the volatile flavors may be either continuous or intermittent, being regulated according to the pressures in the cylinders by means of stop-cock P.

By the operation of the device, it will be seen that all of the volatile aroma, and vaporizing-oils, and flavoring-essences are condensed directly upon and restored to the grains uniformly, whereby the latter are not only improved in quality, but relatively increased in weight, and the surface of the grains is impregnated, moreover, with the condensed extracts, which form a protective and preserving shell for the same that resists the damaging effects of the atmosphere.

After a charge has been cooled the cylinders are again elevated, the cooled charge removed, the roasted charge admitted to the cooling-cylinder, and so on, the tapering or conical end of the cylinder serving to facilitate the discharge of the coffee-beans.

From the foregoing description it will be seen that the main feature of my invention is the use of the revolving cylinders or receptacles, the one for roasting and the other for cooling coffee, so connected as to permit the exhalations which arise from the roasting charge to be simultaneously condensed upon the cooling charge. Now, instead of using a single pipe, O, for the double purpose of admitting the passage of both the coffee-beans and the vaporized extracts, I may, as a modification of my invention, arrange the two cylinders to be rotated separately, but still preserve communication between the two for the passage of the vaporized extracts, which communication may be a pipe connecting with the hollow journals of the cylinders. In this case the coffee-beans may be delivered to and discharged from the cylinders through separate openings closed by proper appliances.

In making use of my invention, also, I may employ a series of roasting and cooling chambers arranged to operate together.

Having thus described my invention, what I claim as new is—

1. A roasting cylinder or receptacle combined with a cooling cylinder or receptacle, rotated together upon the same axis, and having a communication provided with a suitable cut-off, through which the contents of the roasting-cylinder may be passed to the cooling-cylinder, substantially as and for the purpose described.

2. A rotating cylinder for cooling coffee and condensing the aromatic exhalations of roasting coffee on the same as it is being cooled, combined with means, substantially as described, for applying water to the outside of said cylinder to produce the cooling effect upon the hot coffee within, as and for the purpose described.

3. The revolving cooling cylinder or receptacle combined with a water-tank or its equivalent, as described, and arranged upon bearings to be moved into or out of the water or cooling medium, for the purpose described.

4. The rotary roasting and cooling cylinders combined with and journaled in a frame arranged to change from a horizontal to a vertical position, and having a common communication, O, for both the coffee and the aromatic vapors, as described.

5. The cooling-cylinder, arranged to be turned, as described, and provided with an absorbent jacket and a drip-cup, for the purpose set forth.

6. The combination, with the pivoted frame carrying the cylinders, of the water-tank, arranged upon hinged supports, and connected with said frame upon the opposite side of the pivot from the cylinders, as and for the purpose described.

7. The combination, with the furnace G and the standard B, of the frame A and its contained roasting-cylinder, arranged to be lifted from the furnace, and having a surrounding hot-air casing, with an opening below adapted to register with the opening in the top of the furnace, for the purpose described.

8. The sliding sampler N, combined with the revolving cylinder, carrying a lifter, $f$, to deliver the beans to the sampler, substantially as described.

JOSEPH B. UNDERWOOD.

Witnesses:
ELI LONG,
E. W. SCULLEY.